Feb. 25, 1936.                O. U. ZERK                    2,032,036
                      CENTRALIZED LUBRICATING SYSTEM
                      Filed Aug. 29, 1929      10 Sheets-Sheet 1
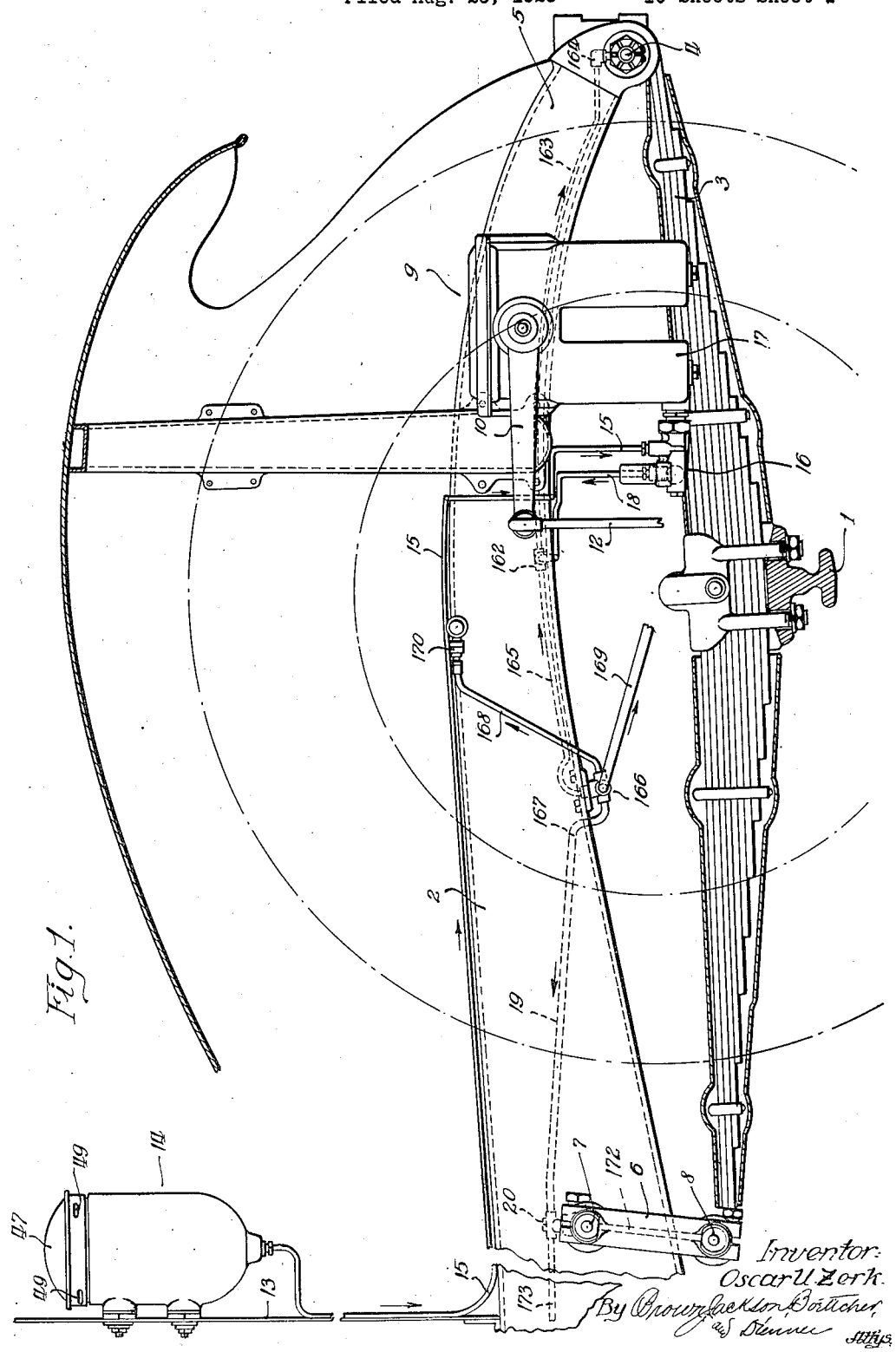

Feb. 25, 1936.　　　　O. U. ZERK　　　　2,032,036
CENTRALIZED LUBRICATING SYSTEM
Filed Aug. 29, 1929　　　10 Sheets-Sheet 2
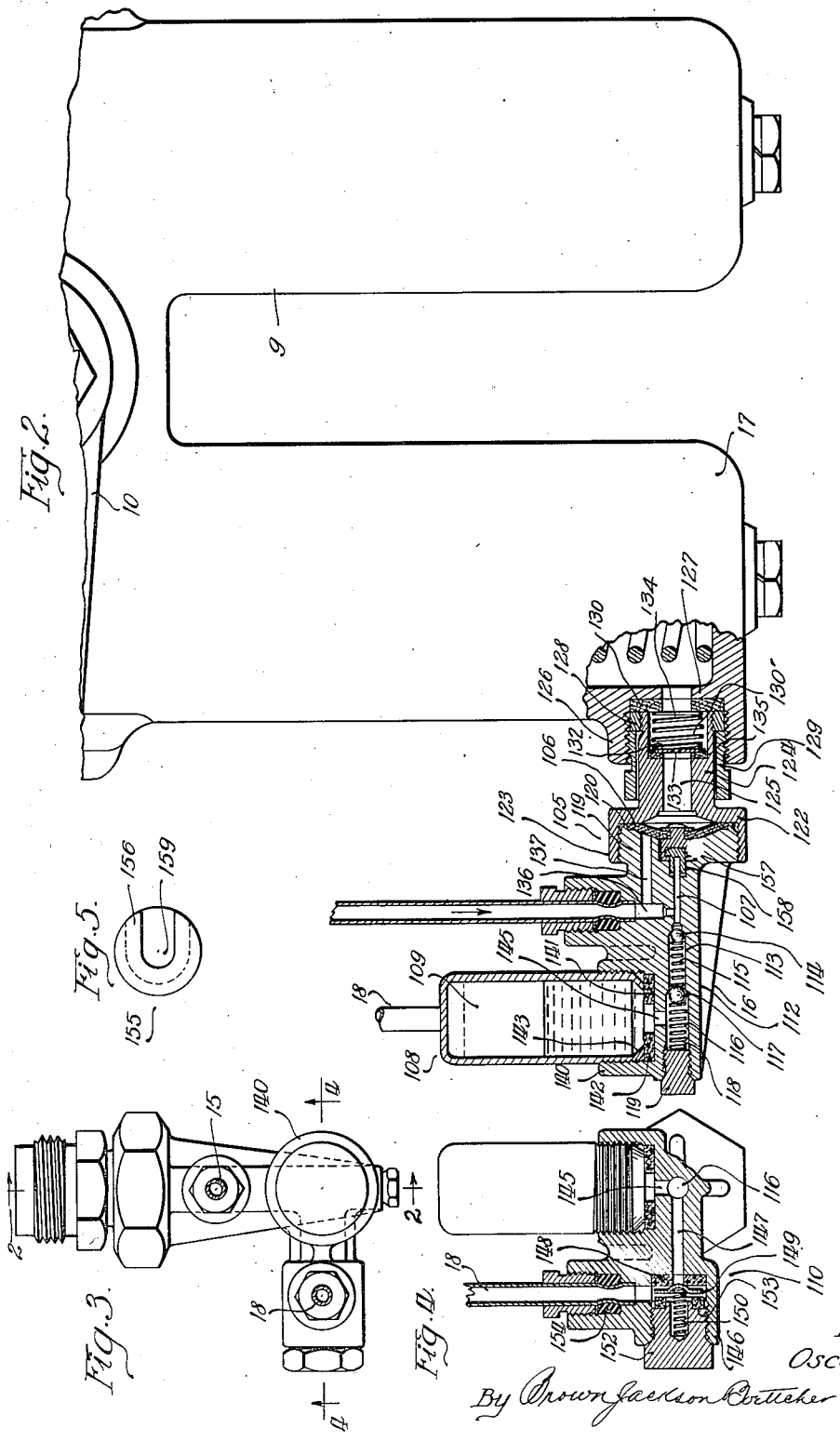
Inventor:
Oscar U. Zerk.
By Brown Jackson Boettcher & Dienner
Attys

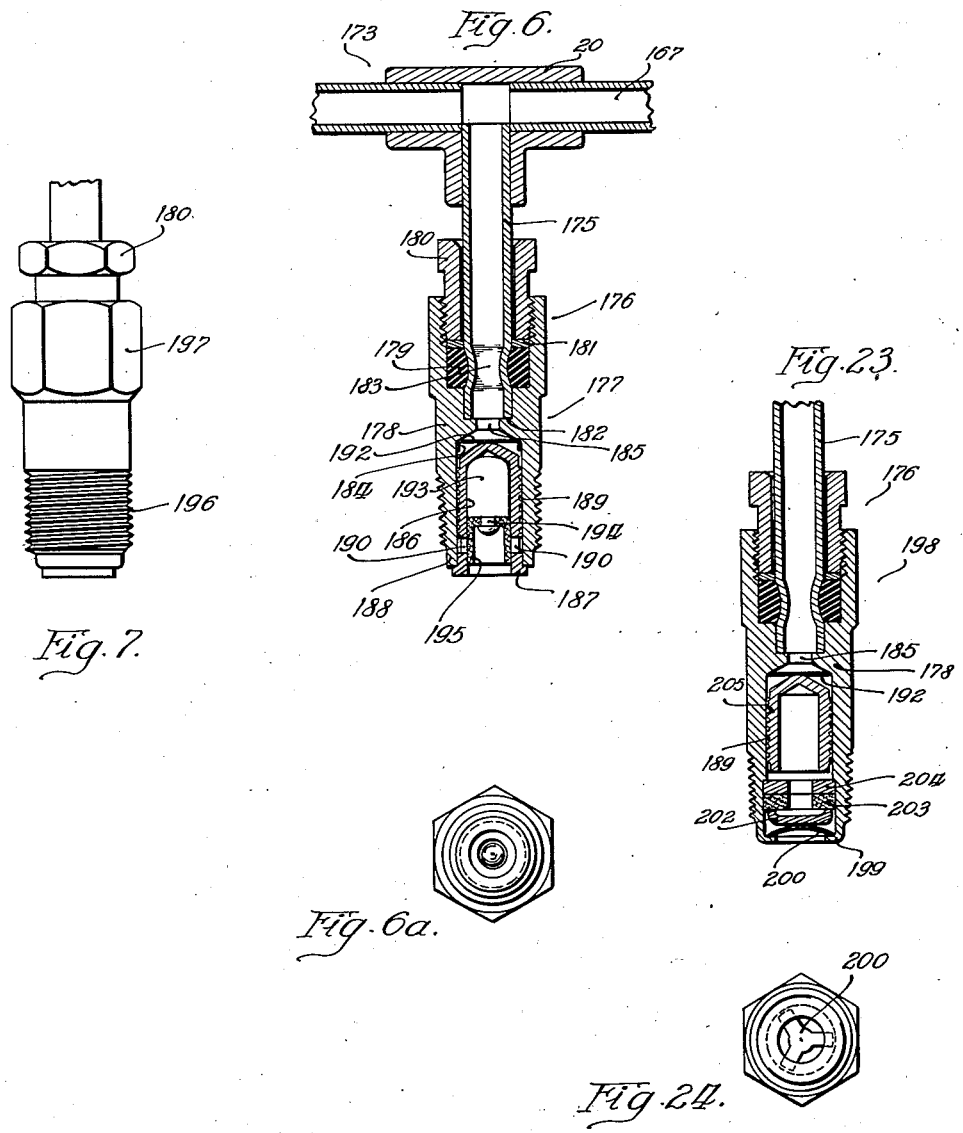

Feb. 25, 1936.    O. U. ZERK    2,032,036
CENTRALIZED LUBRICATING SYSTEM
Filed Aug. 29, 1929    10 Sheets-Sheet 4

Inventor:
Oscar U. Zerk
By Brown Jackson Boettcher & Kenner
Attys.

Feb. 25, 1936.    O. U. ZERK    2,032,036
CENTRALIZED LUBRICATING SYSTEM
Filed Aug. 29, 1929    10 Sheets-Sheet 5
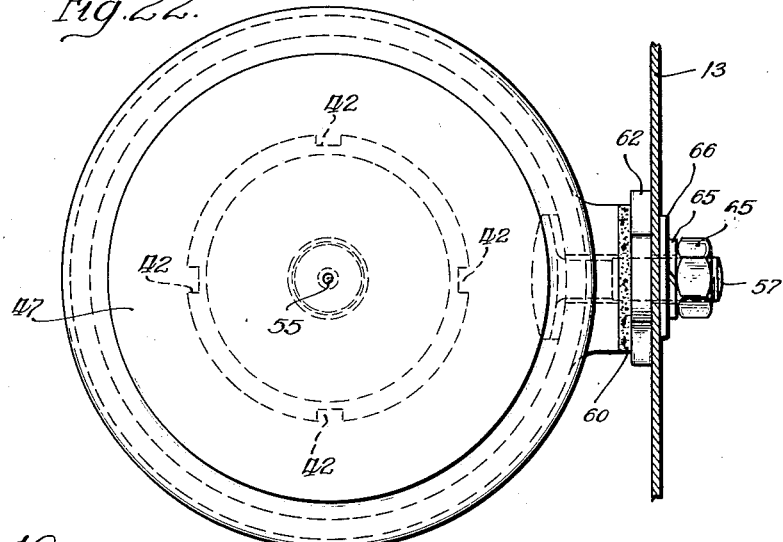
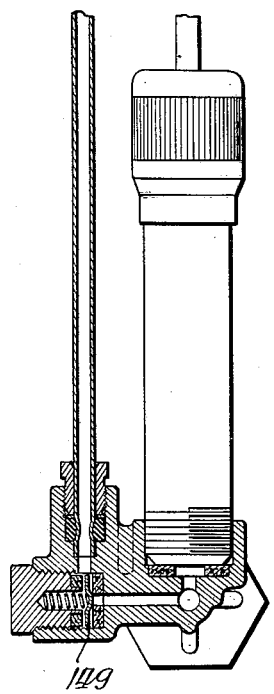
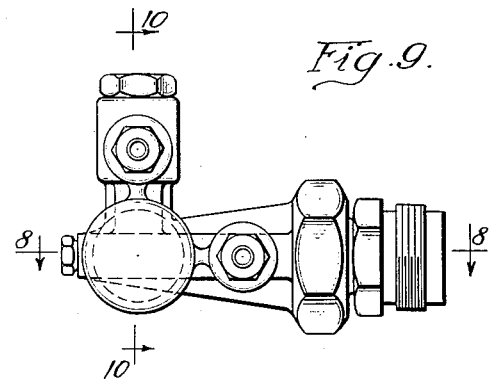
Inventor:
Oscar U. Zerk.
By Brown Jackson Boettcher & Dienner
Attys.

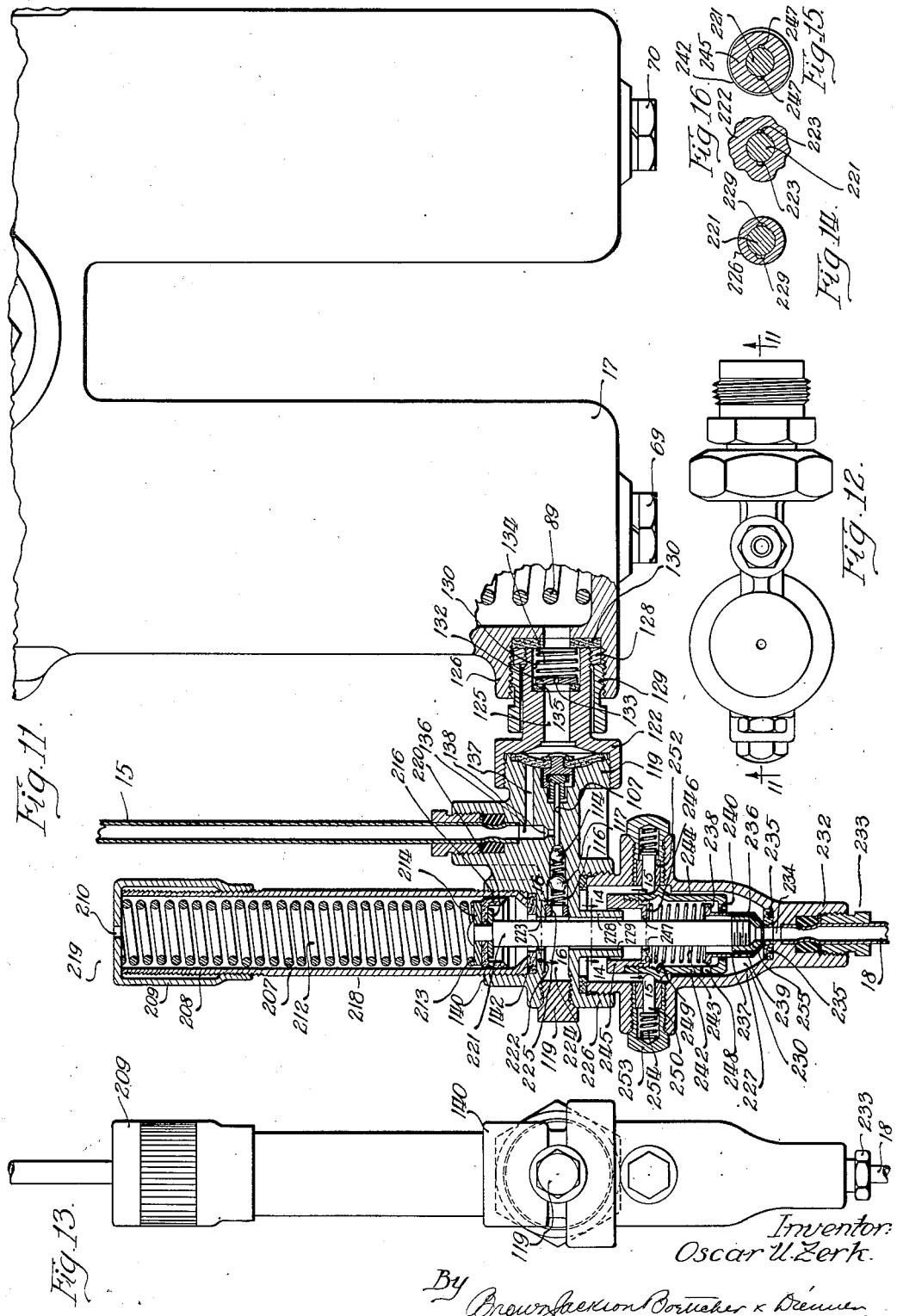

Feb. 25, 1936.　　　O. U. ZERK　　　2,032,036
CENTRALIZED LUBRICATING SYSTEM
Filed Aug. 29, 1929　　　10 Sheets-Sheet 7
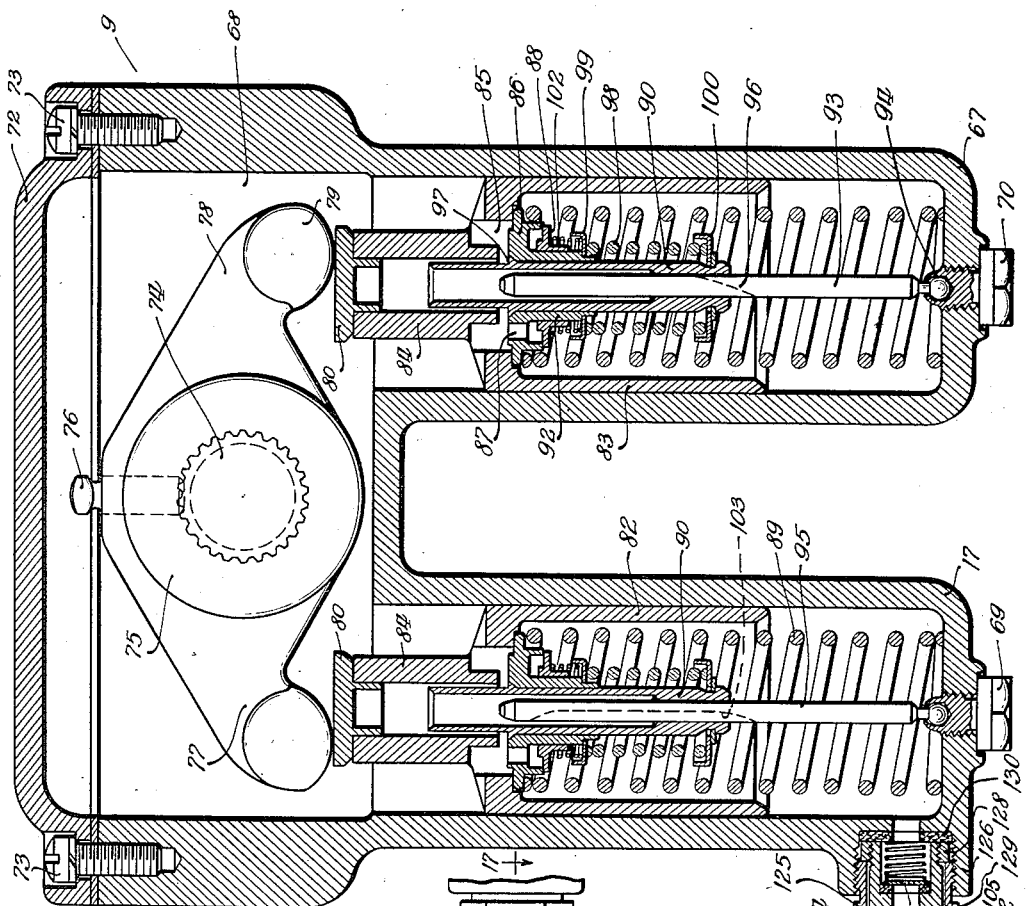
Inventor:
Oscar U. Zerk.
By Crown Jackson Boettcher & Dienner
Attys.

Feb. 25, 1936.  O. U. ZERK  2,032,036
CENTRALIZED LUBRICATING SYSTEM
Filed Aug. 29, 1929  10 Sheets-Sheet 8
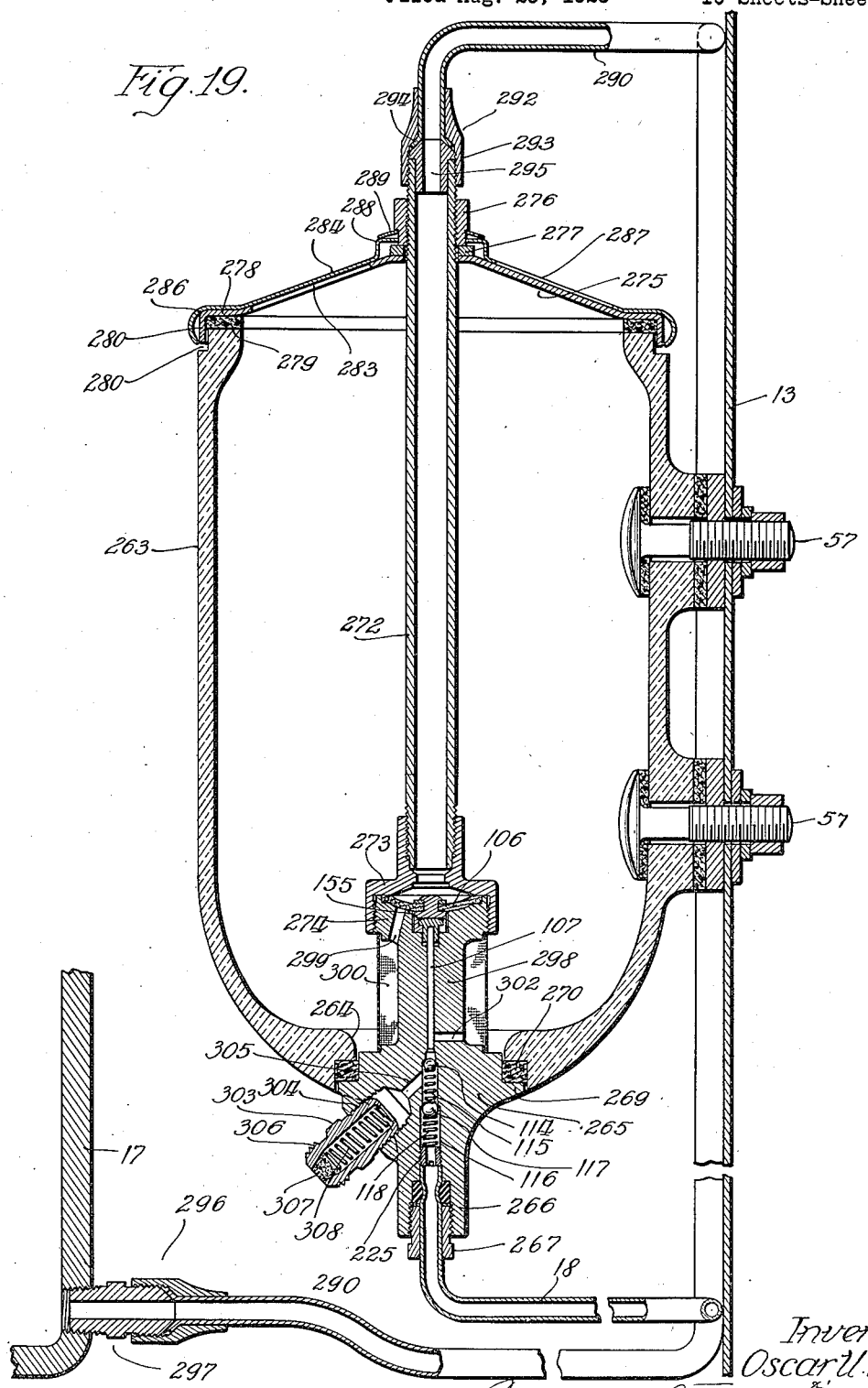

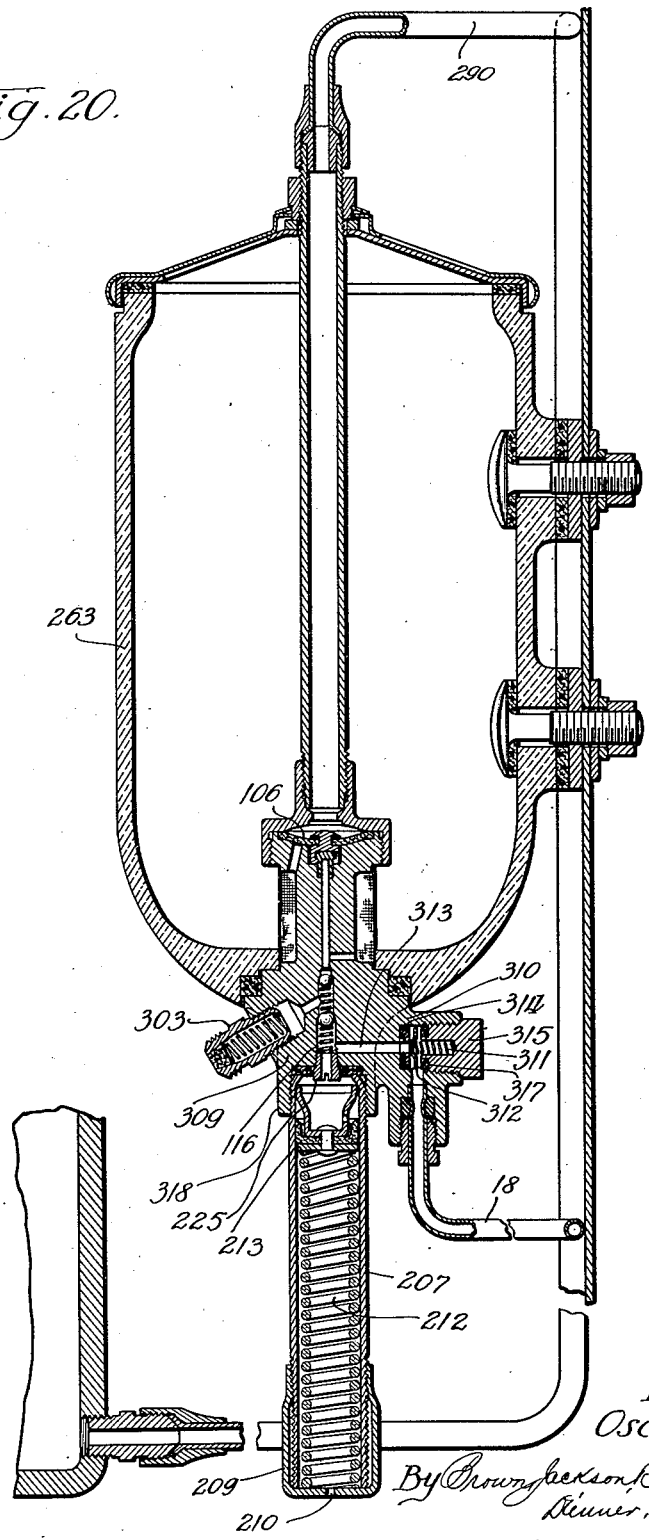

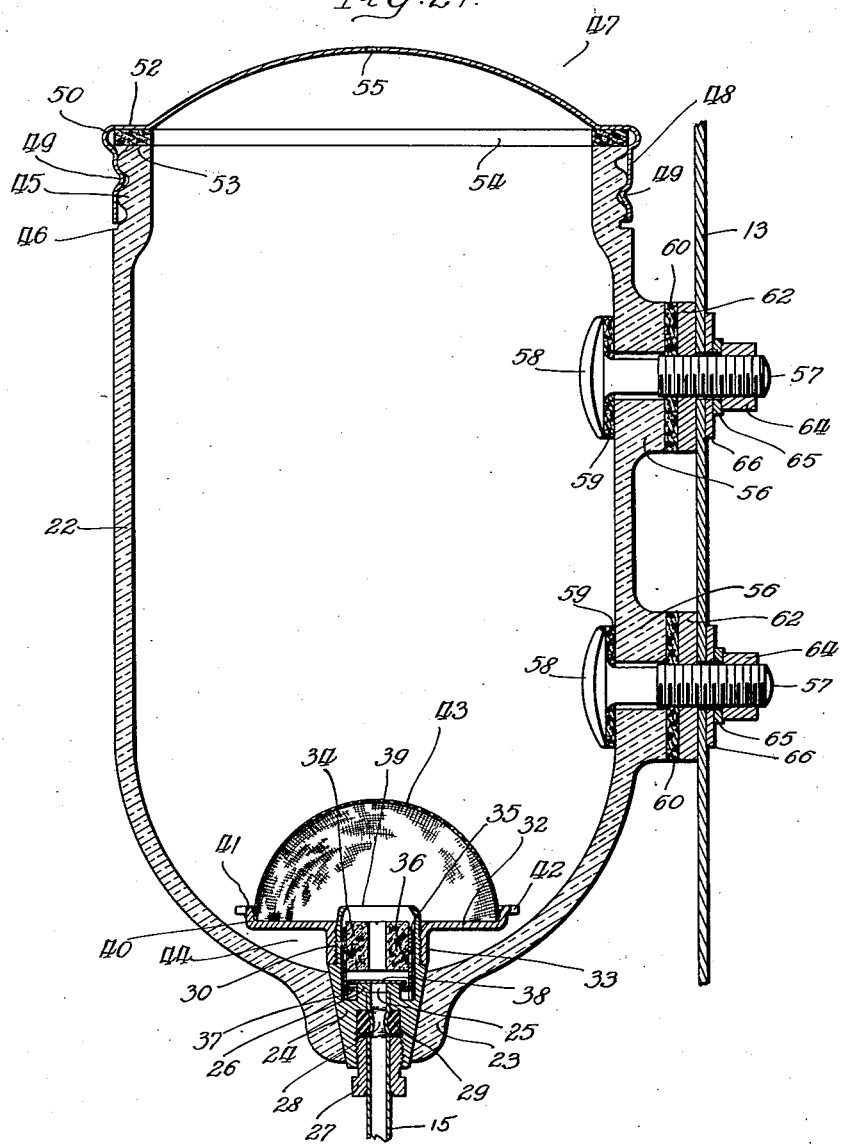

Patented Feb. 25, 1936

2,032,036

UNITED STATES PATENT OFFICE 2,032,036

CENTRALIZED LUBRICATING SYSTEM

Oscar U. Zerk, Chicago, Ill., assignor, by mesne assignments, to Stewart-Warner Corporation, Chicago, Ill., a corporation of Virginia Application August 29, 1929, Serial No. 389,181

23 Claims. (Cl. 184—7)

My invention relates to centralized lubrication and is particularly applicable to automotive work, such as the lubrication of the chassis of vehicles such as automobiles, tractors, gun-carriages, war tanks, locomotives, airplanes and the like. It is also adaptable to industrial lubrication, that is, the lubrication of stationary machines, such as stamping presses, printing presses, textile machinery, shafting, and the various types of machines and machine tools employed in modern industry.

According to the present invention, I employ the variations of pressure of liquid in the hydraulic shock absorber to actuate a pumping plunger of the lubricating pump directly without the intermediate operation of compressed air as the pumping medium.

According to the present system, the discharge of lubricant may be made either intermittent,— that is, by the accumulation of a body of lubricant under pressure and its discharge into the pipe line system and bearings when the accumulating action is completed,—or the discharge of the lubricant pump may be directly into the pipe line system and the bearings, providing what I term "continuous lubrication".

I have observed that the relative motion between the axle and chassis frame of an automobile having the usual spring suspension, and which is reflected in the operation of the shock absorber, is two-fold. That is to say, if the axle is considered as being stationary and the body movable with respect to the same on the spring suspension, the natural period of vibration of the body on the spring suspension, with respect to the axle, is a relatively low frequency of vibration, that is, relatively slow upward and downward motion of vibration. If the body is considered as stationary and the axle with its supporting wheels be considered as a movable body, the natural period of vibration of the axle on the spring suspension is of a much higher frequency.

In practice the body is mounted on the axle through the medium of the springs and, hence, is influenced by axle movements. Therefore, the actual relative motion between the chassis frame and axle is a combination of the two vibrations. The axle tends to follow the road irregularities with only the cushioning of the tire between road and axle, whereas the body, being above the spring suspension, is influenced by the acceleration upward due to pressure of the spring and acceleration downward due to gravity.

I deem it desirable to exclude from the operation of my lubricating system variations of pressure in the shock absorber which would correspond to the rapid vibrations of the axle with respect to the body, as this would tend to cause the system to discharge relatively large amounts of lubricant on gravel roads having the well known washboard corrugation type of irregularities. The slow vibration of the body with respect to the axle is substantially the same over any ordinary road surface encountered in the usual type of driving, whether on country roads or on paved highways or on city streets.

I prefer, therefore, although this is optional within the invention, to exclude the impulses of pressure which are caused by the high frequency vibrations of the axle with respect to the road on the minor irregularities of the road frequently encountered and to employ only the relatively long and slow impulses of pressure which are generated in the shock absorber liquid by the rise and fall of the body with respect to the axle.

The preferred manner in which I accomplish this is by permitting the variations of pressure of the liquid in the hydraulic shock absorber to act upon a motor element, preferably of the diaphragm type, for actuating the oil pump. As a means for distinguishing between the short and rapid variations in pressure caused by minor road shocks and inequalities, and the slow vibration of the body on the spring suspension, I interpose a one-way flow restriction between the liquid of the hydraulic shock absorber and the motor element of the pump operating motor.

This permits the motor to make the stroke of the oil pump freely, but controls the rate of inflow from the hydraulic shock absorber to the motor member so that, unless the impulse of pressure for operating the motor member persists for a predetermined period of time, the pump will not make a discharge stroke. Since the liquid of the hydraulic shock absorber is not compressible, and since the oil pump operates upon oil which is non-compressible, it would appear that any application of pressure of the liquid of the shock absorber to the motor member which operates the pump plunger would result in the discharge of a corresponding amount of liquid; but I have arranged the construction of the pump such that the initial part of the discharge stroke is idle. Hence, short impulses of pressure alternating with impulses of suction in the hydraulic shock absorber will be unable to complete a discharge stroke of the plunger, and such movement of the plunger is, therefore, ineffective to discharge liquid.

By increasing the size of the diaphragm chamber, greater displacement of liquid from the shock absorber cylinder is required to complete a stroke of the diaphragm. It is therefore possible to limit the action of the pump in pumping lubricant to road shocks or vibrations above a certain amplitude.

I believe it is broadly new to employ the variations of pressure in the hydraulic shock absorber for operating a lubricating pump whether the same operates directly upon the oil or through the intermediary of compressing air, which in turn propels the lubricant. I also consider it broadly new to interpose a means for distinguishing between impulses of short duration and impulses of longer duration for securing a substantial uniform discharge of lubricant per unit length of road travel.

It is my object to deliver substantially a uniform amount of lubricant per unit of road travel, and the means which I have herein disclosed and claimed is highly effective to secure the desired action.

The main object of my present invention is to employ the variations of pressure of the liquid of a hydraulic shock absorber to actuate the plunger of a direct acting lubricant pump to force lubricant into the pipe line system either in a continuous fashion, that is, by having each stroke of the lubricant pump discharged directly into the pipe line system, or in intermittent fashion, by accumulating the discharge of the lubricant pump under pressure, and, when a predetermined quantity has been accumulated, to discharge the same into the pipe line system under pressure.

Another object of the invention is to provide simple, inexpensive mechanism of the minimum number of parts for securing the desired results above referred to.

Another object of the invention is to employ a diaphragm as the medium which will transmit the pressure derived from the pulsations of pressure in the shock absorber fluid to the lubricating system.

Another object is to interpose a pumping device between the hydraulic shock absorber system and the centralized lubricating system.

Another object is to perform the pumping action by means which will avoid the loss or escape of liquid from either the hydraulic shock absorber system or from the lubricating system.

Another object of my invention is to attach the lubricant pump directly or indirectly to one of the cylinders of the hydraulic shock absorber. Preferably, I mount the pump on the back of the shock absorber, whereby the shock absorber acts as a shield to protect the pump and pipe lines leading to and from it from gravel and stones which may be thrown from the street.

Another object of my invention is to employ, in conjunction with a lubricating pump actuated by the hydraulic shock absorber, a lubricant accumulating chamber and pressure release valve. Preferably, the accumulating chamber and pressure release valve are mounted directly upon the frame of the pump.

Another object of my invention is to use a compressed air accumulation chamber for oil in place of a chamber having an accumulator piston and spring.

Another object of my invention is to employ a release valve for the accumulator chamber which will retain a predetermined minimum pressure in the accumulator chamber.

Another object of my invention is to provide a separately mounted lubricating pump connected to the hydraulic shock absorber.

Another object of my invention is to combine the lubricating pump, which is actuated by the hydraulic shock absorber, with the reservoir for lubricant, which reservoir is preferably mounted on the dashboard or bulkhead of the automobile.

Another object of my invention is to provide means for closing off the inlet of oil to the pump mechanism and prevent the entry of air when the oil reservoir is substantially empty.

Another object of my invention is to provide a combination lubricating pump and operating diaphragm built into the oil reservoir and connected to the pressure chamber of the hydraulic shock absorber by a suitable fluid pressure conduit.

Another object of my invention is to provide in the combined reservoir and lubricating pump unit a fluid pressure pipe leading to the shock absorber which will serve as a structural member of the aforesaid unit.

Another object of my invention is to employ a resistance unit in connection with a lubricating pump where no pressure accumulation chamber is utilized.

Another object of my invention is to use any kind of metering units in connection with the pump operated by the pulsations of a shock absorber.

Another object of my invention is to provide means for preventing the operation of the lubricating pump by minor road inequalities, but permitting the operation of the lubricating pump for larger road inequalities.

Another object of the invention is to provide means for operating the lubricating pump selectively by pressure impulses in the shock absorber of predetermined amplitude only.

Another object of the invention is to take a part of the motion between chassis frame and axle for operating the lubricating pump through the medium of the hydraulic shock absorber.

Another object of the invention is to make the suction strokes of the lubricating pump immediately upon release of pressure in the hydraulic shock absorber, and to make the discharge strokes of the lubricating pump only after pressure has persisted a predetermined period of time in the hydraulic shock absorber.

Numerous other objects and advantages of the present invention will appear from the following detailed specification and claims:—

I wish to call attention to the fact that certain features of my invention may be varied widely within the scope of the appended claims, and that certain features of the invention herein disclosed are applicable to other uses and in other combinations than the specific ones which I have herein stated.

Now, in order to acquaint those skilled in the art with the manner of constructing and operating a system embodying my invention, I shall describe, in conjunction with the accompanying drawings, a specific embodiment of the invention and the mode of utilizing and operating the same.

In the drawings:—

Fig. 1 is a side elevational view, partly in section, showing the front end of an automobile chassis with one form of my invention applied thereto. This form provides intermittent lubrication.

Fig. 2 is a vertical section through the oil pump and reservoir, taken on the line 2—2 of Fig. 3;

Fig. 3 is a top plan view of the oil pump, reservoir and connection;

Fig. 4 is a vertical transverse section through the pressure release valve and reservoir viewed on the line 4—4 of Fig. 3;

Fig. 5 is an end view of the diaphragm stem showing the attaching socket for the pumping plunger head;

Fig. 6 is a longitudinal sectional view, on an enlarged scale, of a metering unit of my invention, such as may be employed to deliver the lubricant to the respective bearings;

Fig. 6a is a bottom plan view of the unit shown in Fig. 6;

Fig. 7 is a side view of the lower end of the unit shown in Fig. 6;

Fig. 9 is a top plan view of the oil pump, reservoir and connection shown in section in Fig. 8;

Fig. 10 is a vertical transverse section taken on the line 10—10 of Fig. 9;

Fig. 11 is a partial side elevational view of the shock absorber and a vertical longitudinal section of the oil pump, accumulator chamber and release valve of a modified construction taken on the line 11—11 of Fig. 12;

Fig. 12 is a top plan view of the pump and accumulator;

Fig. 13 is a rear elevational view of the same;

Fig. 14 is a fragmentary sectional view taken on the line 14—14 of Fig. 11;

Fig. 15 is a similar view on the line 15—15 of Fig. 11;

Fig. 16 is a similar view on the line 16—16 of Fig. 11;

Fig. 17 is a vertical sectional view through the shock absorber and oil pump of a form for providing continuous lubrication;

Fig. 18 is a top plan view of the oil pump shown in Fig. 17;

Fig. 19 shows a modified form of system embodying a continuously acting pump and glass reservoir unit, the reservoir and pump being shown in vertical section;

Fig. 20 is a similar view of another form of system providing intermittent lubrication, the pump, accumulator and reservoir being built into a common unit;

Fig. 21 is a vertical section through one form of glass reservoir employed in the system shown in Fig. 1;

Fig. 22 is a top plan view of the reservoir shown in Fig. 21;

Fig. 23 is a vertical section of a modified form of metering unit; and

Fig. 24 is a bottom plan view of the same.

Similar reference characters designate similar parts throughout.

Figure 8:
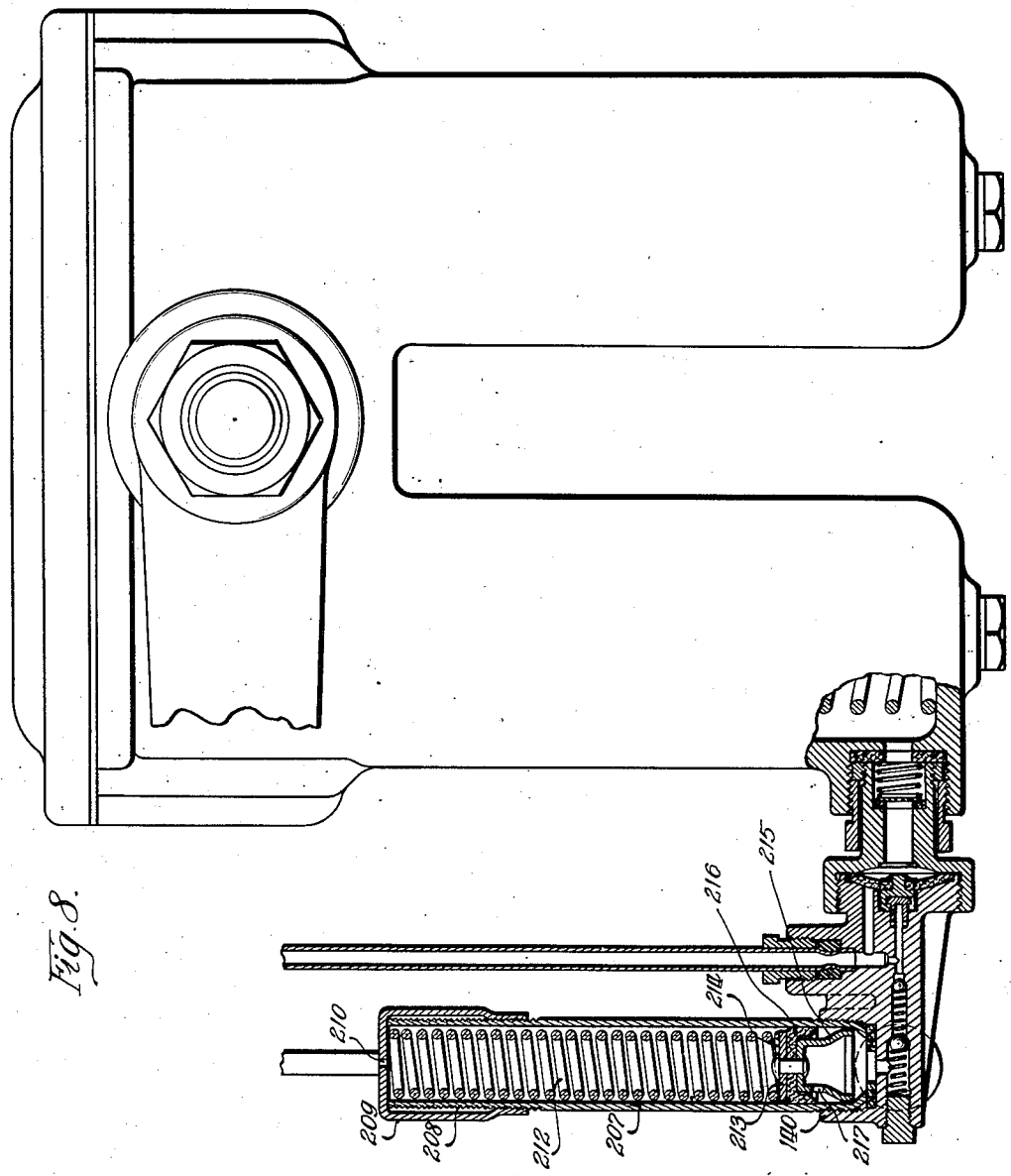
Fig. 8 is a side elevational view of the shock absorber and a vertical longitudinal section through the oil pump and reservoir of a modified form of my invention, this view being taken on the line 8—8 of Fig. 9.

I shall refer first to the complete system shown in Figs. 1 to 7, inclusive. This system comprises as its main operating units, first the oil reservoir unit, second the shock absorber pump unit and third the distribution or pipe line unit.

The reservoir unit provides a supply of lubricant under a gravity head, this reservoir preferably being of the type disclosed in my copending application bearing Serial No. 385,295, and filed August 12, 1929, issued September 12, 1933 as Patent No. 1,926,418 employing a glass bowl or chamber mounted upon the bulk head of the automobile and having a low level shut-off valve for preventing the entry of air into the lubricating pump and distribution system.

The shock absorber pump unit which is here shown as mounted directly upon one of the shock absorber cylinders comprises the motor diaphragm and its controlling orifice, the pump with its plunger and valve, the oil accumulator and the accumulator discharge valve for permitting the discharge of the accumulated oil under pressure into the pipe line system.

The pipe line system comprises a system of distribution pipes and metering units for distributing oil, discharged either directly by the pump or from the accumulator to the various bearings to which the pipe line system is connected.

I shall now describe the general features of the system as shown in Fig. 1 and then describe the various units in detail.

Fig. 1 shows the front end of the chassis of an automobile having the front axle 1. This axle is mounted upon front wheels having pneumatic tires of well known construction which need not here be described.

The chassis frame 2 is mounted upon and connected to the axle 1 through the chassis spring 3. At its front end the spring 3 is connected through a spring bolt 4 to the front horn 5 of the chassis frame 2 and at its rear end the spring 3 is connected to the chassis frame 2 to a spring shackle member 6 having shackle bolts 7 and 8. A two way shock absorber of known type 9 is mounted upon the front end of the chassis frame 2 and it has an operating arm or lever 10 connected by a strut or link 12 to the axle 1. The chassis frame has mounted thereupon a bulk head or dash board 13 preferably made of sheet metal. The parts thus far described are all of known construction, not of the present invention.

The lubricant reservoir 14 which I may herein term the oil reservoir, comprising the first unit of my invention, is mounted upon the dash-board or bulk head 13 and connected by an oil delivery pipe 15 to the shock absorber pump unit 16 which as herein known is mounted directly upon the rear cylinder 17 of the shock absorber 9.

The shock absorber unit 16 is connected by a discharge pipe 18 to the pipe line system generally designated by the reference numeral 19. The pipe line system has pipes running to the various bearings to be lubricated and at these bearings there are provided metering units generally designated 20. The metering units may be of various constructions, preferably embodying resistance passageways and check valves, as will be described more in detail later.

I shall now describe the reservoir unit 14.

*Reservoir unit*

The reservoir unit shown in Figs. 1, 21 and 22 comprises a glass reservoir 22 of generally cylindrical shape with a rounded or spherical bottom portion in which there is formed an apertured boss 23. A metal plug 24 is secured in the aperture in the boss 23 preferably by cementing. A vertical passageway through the plug indicated at 25 terminates at its upper end in a valve seat 26. The lower end of the plug is counterbored and threaded to receive the hollow threaded plug 27 embracing the pipe 15. The upper end of the pipe 15 extends into a short counterbore terminating in a shoulder against which the upper end of the pipe 15 rests. A resilient washer, for example, a rubber washer or other deformable material is disposed between the adjacent end of the hollow screw plug 27 and the bottom of the counterbore. A metallic washer is preferably disposed between the plug 27 and the rubber washer 29 to facilitate turning of the plug to compress the washer. This washer or ring 29 is compressed by the screw plug 27 and tends to constrict the pipe 15 as shown at 28, thereby securing a firm grip upon the same and preventing an endwise movement of said pipe. The pipe 15 may be formed with the constriction by previous operation before the rubber ring 29 is caused to engage the same.

The body of the plug 24 extends upward above the bottom wall of the glass reservoir 22 on the inside of the same and is threaded exteriorly as indicated at 30. A screen plate 32 has a central downwardly extending flange 33 and this flange is interiorly threaded onto the threaded portion 30 of the plug or body 24. The upper end of the body 24 is counterbored to form a housing for a float controlled cut-off valve. The float controlled cut-off valve comprises a cylindrical cork float 34 having a central opening therethrough to permit the passage of liquids freely through the float. This float 34 is gripped in a tubular shell 35 preferably formed of aluminum, as by means of fingers struck inwardly into the body of the float from the side walls of the shell 35.

The cylindrical shell extends downwardly below the body of the float 34 and has a series of fingers 37 struck from the lower margin of the same for supporting the valve disk 38. This valve disk 38 is preferably made of empire cloth or other relatively flexible material, but it may be of metal if desired. The upper end of the housing which is formed in the plug 24 is flanged inwardly as indicated at 39 to limit the rise of the float 34.

The screen plate 32 has an upwardly extending flange portion at 40 terminating in a horizontal flange 41 which is notched or cut out at 42 in equally spaced positions, as for example four such notches, to facilitate turning of the same upon the threads 30.

A convex screen member 43 formed of very fine mesh screen has its downwardly extending rim embraced within the flange 40 and secured thereto preferably by soldering.

The convex screen 43 is shown as hemispherical in form but it might be conical if desired. The purpose of having the same convex is to shed impurities or particles in the oil so as to divert them into the settling chamber 44 provided below the screen plate 32 and above the bottom of the glass reservoir 22.

At its upper end the glass reservoir is preferably provided with coarse screw threads 45 formed integrally upon the rim of the reservoir. These threads are set back or recessed to provide a shoulder 46 and a sheet metal cover member 47 having a downwardly extending flange 48, has a series of short depressions formed therein, these depressions being so disposed as to form parts of a screw thread for cooperating with the threads 45 on the upper peripheral margin of the reservoir 22. The outer surface of the flange 48 is preferably flush with the outer surface of the reservoir 22 to provide a neat and pleasing appearance.

An outwardly convex bead 50 is formed above the downwardly extending cylindrical flange 48 and this is preferably knurled or roughened to facilitate turning of the cover upon the screw threads 45. Immediately above the bead 50 a horizontal flange or shelf 52 is provided and this overlies the upper edge or end surface 53 of the glass reservoir 22.

A cork ring or gasket 54 has its outer margin disposed within the bead 50 and retained thereby in the cover and it serves as a seal between the shelf or flange 52 and the top of the glass reservoir. The central part of the top is convex to give a pleasing appearance and at the central part of the top an atmospheric vent opening 55 is provided.

A pair of integral glass lugs 56 are formed on the side walls, these lugs being apertured to receive the shanks of the bolts 57—57. The inner ends of the bolts have heads 58 which on their under surfaces are convex cylindrical surfaces where they join the shanks of the bolts, the curvature conforming substantially to the curvature of the inner walls of the glass reservoir 22. The apertured bosses 56—56 have flat surfaces at their outer ends of fairly large diameter. Resilient washers 59, for example cork, are disposed under the heads 58 of the bolts between such heads and the inside walls of the glass reservoir. Similar cork washers 60 are placed between the outer surfaces of the bosses 56 and the clamping nut 62 which likewise are of a relatively large diameter and which are threaded upon the threaded shanks of the bolts 57. The bolts 57 are thereby securely connected to the glass reservoir 22 through the cork gaskets or washers 59 and 60. If desired sleeves of cork or rubber may surround the parts of the bolts which lie within the apertures of the bosses 56.

The bolts 57 are passed through openings in the sheet metal bulk head 13 and upon the outer ends of the bolts nuts 64 are threaded with lock washers 65 and flat washers 66 interposed to clamp the large diameter nut 62 against the surface of the bulk head 13. In this manner the glass reservoir is supported upon the bolts 57 and these bolts are independently clamped to the sheet metal bulk head 13. The cylindrical shape of the head 58 tends to prevent turning of the bolts when the nuts 62 are tightened up and any tendency of the bolt to turn thereafter tends to loosen the same in the nut 62 rather than to tighten the same so that the danger of breakage to the glass reservoir is reduced to a minimum.

The sheet metal bulk head 13 forms a resilient mounting for the glass reservoir which tends to save it from road shocks vertically or horizontally because of the resilient diaphragm 13 upon which the reservoir is mounted. The resiliency of the diaphragm 13 about the bolts 57 may be improved by corrugations or the like if desired.

The level of oil in the reservoir 22 may be readily ascertained due to the complete transparent character of the reservoir. The atmospheric vent 55 permits air to enter the reservoir as the level descends and also permits a breathing effect due to temperature changes.

When the level has descended to a point where the float 34 loses its support in the liquid, the valve 38 is applied to the valve seat 26 sealing the same off to prevent the entry of air into the pipe 15. The liquid pump thereupon becomes ineffective to pump liquid until the valve 38 is again opened. As will appear later, a large part of the stroke of the oil pump in either direction is ineffective and hence the tendency to draw a vacuum under the valve 38 is not very great, but if the same should occur it would merely hold the diaphragm of the diaphragm pump in such a position as to prevent the suction stroke and hence rendering the same inoperative.

I shall now describe the shock absorber pump shown in Figs. 1 to 5 inclusive.

*Shock absorber pump*

In order to make clear the operation of the shock absorber pump I shall refer generally to the construction and mode of operation of the shock absorber 9 which is shown in Fig. 17.

The shock absorber 9 comprises a pair of cylinders 17 and 67 which at their upper ends are connected to a common housing 68. The lower ends of the cylinders 17 and 67 are closed off by integral heads, these heads having threaded openings into which plugs 69 and 70 are threaded.

The upper end of the housing 68 is closed by a cap or head member 72 held in place by cap screws 73.

A rocking shaft 74 is journaled in the side walls of the chamber 68, the inner end of the inner journal being integrally sealed by the wall of the chamber 68. The rock shaft 74 extends outwardly to the outer side wall of the chamber 68 to make connection with the lever arm 10 exteriorly of the housing 68. The rocker shaft 74 has a rocker 75 keyed or splined thereto, set screw 76 preventing endwise displacement of the rocker on the shaft. This rocker has a pair of arms 77 and 78 terminating in contact fingers 79. These contact fingers 79 bear upon hardened bearing plates 80 mounted centrally of the pistons or plungers 82 and 83. These plungers 82 and 83 have reduced necks 84 at their upper ends, the bearing plate 80 being mounted upon the upper ends of said necks. Each plunger is provided with a valved inlet passageway 85 extending down and in at the junction of the neck and the body of the plunger, the inner end of the passageway 85 being closed by a valve plate 86 provided with reduced inlet passageways 87, the lower ends of which are again controlled by another valve plate 88. A main compression spring 89 rests against the bottom of the cylinder 67 and at its upper end rests against the flange of the larger inlet plate valve 86. A slidable sleeve 90 extends through the stem 92 of the inlet valve plate 86 and it embraces the metering pin 93 the lower end of which metering pin is mounted in the ball and socket joint 94 in the plug 70. The metering pin 93 finds its counterpart in the metering pin 95 in the cylinder 17, these two pins being slotted in a slightly different manner since the cylinder 67 serves to take the shock between the axle and chassis frame and the cylinder 17 serves to check the rebound between the same elements.

The metering pin 93 is slotted above the dotted line 96 to permit the escape of liquid from below the piston 83 when the piston is forced downwardly. The sleeve 90 has a shoulder 97 resting against the valve plate 86 and has a very strong compression spring 98 engaging the spring seat collar 99 resting against the shoulder on the stem 92. The lower end of the spring 98 rests against a spring seat collar 100 secured to the lower end of said sleeve 90. The secondary valve plate 88 is held to its seat by a relatively weak spring 102 the lower end of which spring rests against the spring seat ring 99.

The metering pin 95 has a slot 103 which extends only part way through the pin.

In brief, the operation of the shock absorber is as follows. When the axle is forced upward by engagement of a rise in the road the lever 10 is turned in a clockwise direction, the arm 78 descending and forcing the plunger 83 downwardly. The valve plates 88 and 86 tend to remain closed and liquid is forced through the slot in the metering pin 93. If the motion is such as to tend to force the sleeve 90 over the slot in the metering pin, the pressure in the chamber 67 will rise and tend to hold the sleeve 90 from closing said slot.

Upon rebound the arm 77 descends and the arm 78 rises. The spring 89 forces the plunger upwardly permitting the valve plate 88 to open.

The entire chamber and both cylinders are filled with a thin, non-freezing liquid. Downward motion of the arm 77 forces the plunger 82 downwardly compressing liquid in the cylinder 17. I speak of compressing the liquid not in the sense that the liquid is compressible but in the sense of putting the same under pressure. The liquid ascends through the groove 103 as well as through the clearance between the plunger and the cylinder, although the latter is intended to be a tight fit. As in the previous case any tendency to drive the sleeve 90 downward beyond the closing point of the slot 103 results in the generation of a pressure which holds said sleeve 90 and permits of the continued escape of liquid through said slot 103. As soon as rebound is checked and the chassis starts toward the axle or vice versa the spring 89 and the cylinder 17 throws the plunger 82 upwardly causing it to follow the arm 77. At this time the pressure in the cylinder 17 drops substantially to zero or to a negative pressure with respect to atmosphere creating a suction in such cylinder 17.

So much of the shock absorber 9 as I have just above mentioned is known.

While I describe my pump as connected to this known type of shock absorber it is to be understood that I do not intend to limit the invention to the use of this specific form of shock absorber, nor to any specific form.

Also, while I shall describe the lubricating pump as operated by variations of pressure in the rebound checking cylinder 17, I do not wish to be limited to a particular cylinder. The pump can be operated in a satisfactory manner by variations of pressure in the cylinder 67 which operates on approach of the axle and frame toward each other.

The pump unit 16 (see Figs. 2, 3, and 4) comprises four main units or elements, viz. the motor member 105 comprising the diaphragm 106; second, the pump element including the piston or plunger 107; third, the accumulator 108 comprising a chamber 109; and fourth, the accumulator discharge valve 110.

The unit 16 comprises a main frame member 112 which embodies a cylinder bore extending horizontally, this cylinder bore having the plunger 107 mounted therein. The cylinder bore is of very small diameter. To the left of the cylinder bore there is a counterbore providing an enlarged chamber 113 terminating in a valve seat at the junction of said chamber and the cylinder bore.

A ball check valve 114 held by a spring 115 seats in said valve seat and forms a discharge check valve. Beyond the chamber 113 a second counterbore provides an enlarged chamber 116, the junction of said chambers 113 and 116 forming a valve seat for the ball valve 117 which is held to its seat by a spring 118 resting against the screw plug 119 which closes the outer end of the bore. The two check valves 114 and 117 are employed for the sake of securing a substantial tight discharge check valve, leakage being an important matter because of the extremely small displacement of the lubricating pump.

The rear end of the cylinder frame has an enlarged head member 119 which is peripherally threaded. The end face of the head 119 is cup-shaped and is provided at its outer margin with a flange 120 to confine the peripheral edge of the diaphragm 106. A companion head member 122 having a threaded flange 123 threaded upon the head 119 serves to grip marginally the diaphragm 106. The head member 122 is also cup-shaped at its center to provide a suitable chamber in conjunction with the cup or hollow shape of the head member 119, in which the diaphragm 106 may play back and forth.

The rear end of the head member 122 has a hollow stem providing a passageway 125 placing the diaphragm chamber in communication with the inside of the shock absorber cylinder 17. The shock absorber cylinder is provided with an integrally formed threaded flange 126 terminating in a shoulder 127. The hollow stem 124 of the head member 122 has a ring 128 threaded and soldered thereupon to provide a shoulder against which the inner end of a threaded coupling sleeve 129 bears. A gasket 130 is interposed between the end of the hollow boss 124 and the seat 127 to provide a fluid tight joint when the threaded sleeve 129 is drawn up tight.

It is to be observed by this construction it is possible to couple and uncouple the pump unit 16 without disconnecting the pipes 15 and 18. This is because it is not necessary to turn the stem or shank 124 to make the coupling with the cylinder 17 of the shock absorber.

The stem or boss 124 of the head member 122 is counterbored at its rear end to provide a chamber 130'. In this counterbore I disposed the check valve 132 having a flow restricting orifice 133 therethrough. A relatively weak spring 134 holds the check valve 132 to its seat which is formed of a relatively yielding member 135 to avoid noise, said yielding seat being seated upon the shoulder formed between the counterbore 130 and the bore 125. The purpose of this flow restricting orifice 133 and check valve 132 is to prevent quick pulsations of pressure in the chamber 17 from operating the diaphragm 106 to make a discharge stroke of the pump. The diaphragm 106 is disposed directly between the liquid in the lubricating system and the liquid in the shock absorbing system and is subjected to the pressures of such liquids. The supply pipe from the reservoir 14 communicates with a passageway 136. The passageway 136 has two branches, one branch 137 leading to the cup-shaped head 119 and thereby permitting the hydrostatic head of liquid in the reservoir 14 to be applied to the left-hand side of the diaphragm 106. The other branch at 138 terminates in a port ending in the cylinder bore which port is overrun by the pumping plunger 107 for a full stroke of the diaphragm 106.

Now it may be seen that this diaphragm 106 lies directly between the liquids of the two systems and is responsive to the preponderance of pressure. When the piston in the shock absorber of cylinder 17 rises, the preponderance of hydrostatic head in the reservoir 14 and atmospheric pressure upon the same tends to force the diaphragm 106 to the right because of the suction or drop of pressure which is created by the rise of the plunger 82 under the influence of the spring 89.

Under this action the check valve 132 opens and permits such liquid as is in the diaphragm chamber to be drawn into the cylinder 17. Upon reverse operation, that is when the plunger 82 in the chamber 17 is forced down by rise of the chassis frame or body relative to the axle, the liquid in the cylinder 17 of the shock absorber is put under pressure just as soon as the piston 82 is pressed downwardly. Since the capacity of the diaphragm chamber is relatively very small and the passageway 125 otherwise relatively large, the first downward motion of the shock absorber plunger 82 would tend to make a full stroke of the diaphragm and the connected pump piston 107. However, to prevent this immediate response I have interposed a flow restriction 133 so that an appreciable period of time is required to force sufficient liquid through the flow restriction 133 to carry the diaphragm 106 and its connected plunger 107 through a complete stroke.

The initial part of the stroke of the pump plunger 107 is not effective to discharge liquid past the check valves 114 and 117 since no pressure will be put upon the liquid in the pumping cylinder until the plunger 107 overruns the inlet passageway 138. Therefore, the short vibrations caused by minor road irregularities, particularly such as are encountered on gravel roads where for miles there may be the short transverse corrugations in the road which would tend to cause over-lubrication, are not effective to cause discharge strokes of the pump except as they are of sufficient amplitude to cause a persistance of pressure for a predetermined period of time.

The cylinder frame member has at its left hand end as viewed in Fig. 2 a circular flange 140 which is threaded interiorly and terminates in its lower end in a flat seat 141. Upon this seat there is placed a washer or gasket 142. A small reservoir member 109 which is closed at its upper end has its lower end threaded to engage the threads in the sockets formed by the flange 140. The lower end of the chamber 109 has an inwardly turned flange 143 which engages the gasket 142 to form a fluid tight joint. A vertical passageway 145 provides communication between the discharge check valve chamber 116 and said reservoir chamber 109.

The accumulator discharge valve 110 comprises a valve housing 146 formed integrally with the body 112 of the pump frame. A passageway 147 provides communication between the chamber 116, that is the discharge check valve chamber and the interior of the housing 146. The housing 146 is in communication with the discharge of the pump and also in communication with the accumulator chamber 109. The outer end of the passageway 147 terminates in a valve port, a yielding valve seat 148 being seated in the bottom of the housing 146 and being adapted to be engaged by the valve 149. The valve 149 is preferably formed of a sheet metal disk having a bulge or convex portion at its center closing off the opening in the valve seat 148. Back of the valve 149 there is the compression spring 150 seated in a recess in the screw plug 152 which closes the end of the housing 146.

A yielding seat member 153 in the form of a ring around the spring 150 is adapted to be engaged by the margin of the valve 149 when the same is opened by the accumulated pressure in the chamber 109.

It is not desirable to release entirely the pressure in the chamber 109 and this result is secured by the tension of the spring 150 and the change of area of the valve exposed to pressure caused by the opening and closing of the same.

The pipe 18 is connected to the interior of the housing 146 by the pipe coupling 154 which is of the construction heretofore described. That is to say, it comprises a hollow screw plug embracing the pipe 18 and a deformable ring or washer compressed against the constricted walls of the pipe 18 adjacent the end of the same. The pipe communicates through a passageway formed in the body of the chamber 146 with the discharge side of the valve 149.

The diaphragm is connected to the plunger 107 through a detachable connection. The diaphragm 106 has a stem member 155 shown in end view in Fig. 5. This stem has a stud projecting through the center of the diaphragm 106 and provided with a washer. The end of the stud is riveted over the washer and the diaphragm is, therefore, gripped between the flat annular faces of the washer and the body 155.

The body 155 which forms the diaphragm stem has milled therein from one side a recess 156 into which the head 157 of the plunger 107 may be seated. The head 157 has a cylindrical socket portion 158 into which the end of the plunger 107 is securely pressed and retained and this cylindrical portion 158 of the head lies in a slot 159 in the stem member 155.

It can therefore be seen that the plunger 107 is readily detachable from the diaphragm stem 155 and also due to the slight play which is permissible between these parts, a slight universal connection is permitted.

The stem 155 is cylindrical and is guided in a cylindrical recess in the head member 119. The said head member seats against the shoulder when the diaphragm lies flat against the concave surface of the head member 119 so as to support said diaphragm over its entire area at its extreme outward position. This is highly desirable since the pressure of liquid in the shock absorber cylinder 17 may rise to very high values.

The operation of the shock absorber pump unit will now be apparent. When the shock absorber plunger 82 descends it creates pressure in the cylinder 17 which tends to force liquid through the flow restriction 133 serving to drive the diaphragm 106 toward the left as viewed in Fig. 2. The outward travel of the diaphragm and its connected plunger 107 is not effective to pump liquid until the plunger 107 overruns the port 138. Therefore unless the period of pressure in the cylinder 17 persists long enough to force substantially a complete movement of the diaphragm 106 no discharge past the check valves 114 and 117 will occur. If the pressure persists long enough the stroke will be completed and a small quantity of oil will be forced past the check valves into the accumulating chamber, the valve 149 being closed at this time. Upon any reverse pressure in the cylinder 17 by raising of the plunger 82, the hydrostatic head of liquid in the reservoir 14 acting through the pipe 15 and passageway 137 will tend to throw the diaphragm 106 to the right, the check valve 132 in which the flow restriction 133 is formed being readily opened in order to permit of this action.

If the flow restriction 133 is not employed but free communication between the chamber 17 and the diaphragm chamber is divided, then the stroke of the diaphragm and its plunger 107 will be made by the initial movement of the shock absorber plunger 82 in its downward direction. It will be observed that the ratio of areas of the plunger 107 and diaphragm 106 is such that very little pressure is required on the diaphragm 106 to make the discharge stroke even against a very considerable reservoir pressure. The reservoir pressure is preferably maintained between one hundred pounds' discharge pressure when the valve 149 opens and approximately fifteen pounds' pressure when the valve again closes. Obviously any desired limits may be employed.

Upon the accumulation of the desired maximum pressure in the chamber 109 the valve 149 opens and permits the air which is trapped in the top of the chamber 109 to expand and forces the oil through the passageways 145, 116 and 147 past the check valve 149 and into the pipe line system. In the pipe line system the oil is distributed to the bearings in a manner which will now be further explained.

*Pipe line system*

The pipe line system indicated at 19 in Fig. 1 consists of a series of pipes and connections leading to the various bearings to be lubricated. The details of carrying the pipe around the chassis and in making connections between the various sections of pipes will be readily understood by those skilled in the art from the portion of the system shown in Fig. 1.

The pipe 18 as shown in Fig. 1 has a detachable coupling to the pump unit 16. Preferably the pipe line system is made up in sections of which the various parts are soldered together and the sections are then connected by pipe couplings of the type above described in connection with the anchoring of pipes 15 and 18 to the body of the pump unit.

As shown in Fig. 1 the pipe 18 is connected to a T 162, this T being preferably soldered to the three connecting pipes. A pipe 163 leads forwardly to a metering unit 164 leading to the front spring bolt 4. The other branch pipe 165 leads to a four-way connection 166 which is connected to the lower flange of the frame member 2. This connection 166 has pipes 165, 167 and 168 soldered thereto and has a threaded socket for receiving the coupling of the flexible pipe 169 which leads to the bearings on the axle 1. This flexible pipe 169 is bent in the shape of a hairpin lying in substantially a horizontal plane. The flexible pipe 169 is preferably constructed of a spirally wound strip covered with rubber and being capable of twisting to permit the rise and fall of the axle 1 with respect to the frame without injury to the pipe 169.

The pipe 168 is provided with a detachable coupling 170 leading to the four-wheel brake mechanism.

The pipe 167 leads back to the T connection 20, the discharge of which leads to the shackle bolt 7.

A passageway 172 from the shackle bolt 7 leads to the shackle bolt 8. From the T 20 the pipe continues at 173 to other bearings variously located.

At the T 20 the coupling 170 and the L connection 164 where oil is delivered to the bearings, metering units of the type shown in Figs. 6 or 23 are employed. Referring now to Figs. 6 and 7, the T 20 has a bottom outlet 175 in the form of a short piece of tubing, the upper end of which is soldered in the T as are the connecting pipes 173 and 167. The pipe 175 is connected to a resistance unit 177 by a releasable coupling 176. The releasable coupling comprises a socket formed in the shell member 178, this shell member being preferably formed of hexagon stock in a screw machine. The upper end of the shell member has a socket in which there is seated the resilient or deformable washer 179 which is compressed by means of the annular plug 180, a washer 181 being disposed between the plug and the ring 179. The lower end of the pipe 175 is seated against a shoulder 182 formed in the body of the shell 178 and above the end of the pipe there is formed a constriction 183 into which the ring 179 is distorted. The constriction may be created by distortion of the rings and of the walls of the pipe under the pressure of the screw plug 180 or the constriction 183 may be preformed and the ring 179 merely forced into engagement with the walls of the same.

The lower end of the shell 178 has a chamber 184 formed therein by the counterbore communicating with the passageway 185 leading to the pipe 175.

The chamber 184 has forced thereinto a hollow closed end member 186 which has a shoulder 187 at its lower end overhanging the lower end 188 of the shell. The hollow plug member 186 has a helical passageway 189 formed about the periphery of the same down to a point adjacent the lower end thereof and has side openings 190—190 formed through the side walls communicating with the lower end of said helical passageway 189. The upper end of the hollow plug 186 is coned and at its center bears against a screen wire 192 which is shaped like an inverted cup. An expanding plug member 193 having a pin 194 which is headed over the bottom of a cup leather 195 is forced into the hollow plug member 186 to expand the same into contact with the walls of the shell 178. The cup leather 195 closes the passageways 190 and serves as a check valve to prevent reverse flow of liquid. The cup leather 195 permits the flow of oil through the helical groove 189 and into the interior of the bearings, that is, in a downward direction as viewed in Fig 6, but checks any return flow. The lower end of the shell is threaded as at 196 and the upper end is provided with a hexagon wrench engaging portion 197. It will be apparent that the coupling 176 may be released to remove or replace the shell 178 and its resistance plug 186 without breaking the pipe line system.

The hollow plug 186 is preferably formed of soft metal and it may be die cast. It is formed of a diameter slightly smaller than the inside diameter of the recess 184 in which it is seated. It is inserted in the bore of the recess 184, a shoulder or flange serving to limit its inward motion, and then the expanding plug 193 is driven to the bottom of the same, this expanding plug being gripped by the inside walls of the hollow plug and serving as an anchor for the cup leather 195. The discharge openings 190 which communicate with the lower end of the helical resistance passageway extend radially inwardly through the walls of the hollow plug 186 and are covered by the cylindrical surface of the cup leather 195. Below the ports or passageways 190, the body of the hollow plug 186 fits tightly into the open mouth of the lower end of the shell 178 to seal off any communication between the interior of the bearing and the helical groove 189. The hollow plug has an annular shoulder to engage the end of the shell for fixing the position of the parts.

If desired a spring pressed check valve may be employed between the resistance groove and the bearing. In Figs. 23 and 24 I have shown a unit 198 in which a spring pressed check valve is employed. This unit 198 has the coupling 176 to the pipe 175 as described in connection with Fig. 6. The shell 178 is substantially the same as the shell shown in Fig. 6 except that the same is slightly longer in the waist portion and has a flange 199 at its lower end turned inwardly to support the three-armed spring spider 200 which bears against the central part of the check valve 202.

This check valve 202 is cup-shaped facing upwardly, its rim or margin engaging a yielding seat member 203. The yielding seat 203 rests against a washer or apertured metal plate 204 which seats against the shoulder in the lower end of the bore of the shell 178. Above the washer 204 as viewed in Fig. 23 I provide the hollow resistance plug member 205 which has the helical resistance passageway 189 formed upon the cylindrical surface of the same. The plug 205 may be driven into the opening, but preferably it is inserted and expanded into the opening in the shell 178. The screen 192 is interposed between the inlet passageway 185 and the helical resistance passageway 189 to screen out impurities. The screen 192 in each form is preferably provided with a flange, this flange being of relatively short length not long enough to engage with or block the helical resistance passageway 189. The center of the screen is supported upon the convex or conical center of the plug member 205. In this unit the check valve 202 is maintained against its seat 203 by the spider-shaped spring 200, the arms of which rest upon the inturned flange 199.

While I have shown two forms of resistance units which are suitable for use in the pipe line system of my invention, it is to be understood that suitable resistance units or metering units of any known or preferred construction may be employed.

The operation of the resistance unit will be apparent from the foregoing description.

When the pressure release valve 149 opens and a charge of oil under pressure is injected into the pipe line system 19 oil will be driven through the pipe line system to each of the resistance units and a substantially equal emission of oil where equal emission is desired will be secured at the respective bearings. By control of the size of the opening or the length thereof the proportionate emission for each discharge of the accumulating chambers may be controlled.

The valve 149 which controls the discharge of pressure from the accumulating chamber closes when the pressure drops to a predetermined value and thereupon the pipe line system is completely sealed off, first by the check valves at each of the metering units and next by the discharge valve 149.

While I have described a complete system, it will be apparent that there are permissible variations and modifications within my invention, some of which I have illustrated and shall now proceed to describe. The above system is a system for providing intermittent lubrication, that is the bearings are periodically lubricated by the accumulation of a charge of lubricant which is then injected under pressure into the pipe line system. I shall first describe the modifications of this form of system and then shall describe the form of pump in which continuous lubrication for the system is provided.

Accumulating chamber with spring pressed piston

In Figs. 8, 9, and 10 I have shown a shock absorber pump unit in which the accumulator chamber instead of being a closed top air-trap comprises the cylinder 207 which is threaded into the threaded socket 140 on the cylinder frame. The upper end of the cylinder is threaded at 208 to receive the threaded compression cap 209. The cap 209 is vented at 210. It serves to compress a strong compression spring 212 bearing upon the piston 213. This piston comprises a back plate 214 and a guide plate 215 with a cup leather 216 between them. The guide 215 is a cup shaped member bearing against the side walls of the cylinder 207 and guiding the cup leather and back plate 214 within the cylinder. A suitable opening 217 is formed in the guide 215 to permit the liquid pressure to act upon the cup leather 216 to hold the same tight. The compression of the spring 212 may be governed by the position of the cap 209 and the cap 209 may serve to release the compression on the spring when the device is to be disassembled. In all other respects the embodiment of Figs. 8, 9, and 10 is like that described in connection with Figs. 2, 3, 4, and 5 and the description and reference numerals previously employed apply to the embodiment of Figs. 8, 9, and 10. In operation the liquid on the pressure delivered by the shock absorber operated system 107 discharged into the cylinder 207 below the piston 213 the rise of the piston 213 serving further to compress the spring 212 until a pressure is attained at which the release valve 149 permits the escape of liquid from the accumulator.

When the pressure has dropped to the predetermined minimum the valve 149 again closes. The type of pipe line system and resistance unit may be as above described or of any other preferred type or construction.

Spring pressure type of accumulator with snap release valve

In Figs. 11 to 16 inclusive I have shown a modified form of pump unit in which the connection to the shock absorber cylinder is the same as previously described in connection with Figs. 2 to 5 inclusive. The construction of the diaphragm chamber and the pumping cylinder and piston connected thereto is also the same as described in connection with Figs. 2 to 5 inclusive and like reference numerals describe like parts throughout. The cylinder frame 218 is however modified to embody the spring type of accumulator of the character set forth in Figs. 8, 9 and 10. The cylinder 207 is threaded into the threaded socket 140 on the cylinder frame 218. This cylinder contains the spring 212 with the cap or cover 209 threaded on the thread 208 on the cylinder 207, the lower end of the cylinder 207 being sealed by the gasket 142 as shown in Figs. 2 and 4. The piston 213 comprising the back plate 214 the cup leather 216 and the front washer 220 is mounted upon a stem 221 which passes loosely through the bottom wall 222 of the accumulator chamber. The wall 222 is a part of the cylinder frame 218. As shown in Fig. 16 the stem 221 is guided in said wall 222 but grooves 223 permit communication between the chamber 224 and the interior of the cylinder 207.

The chamber 224 is closed at its outer end by the plug 119 and communicates with the discharge end of the discharge check valves 114 and 117 forming a continuation of the chamber 116 in which the spring for the second check valve 117 is retained. A retainer ring 225 is threaded into the end of the check valve chamber to retain the spring 116. On the lower side of the cylinder frame 218 there is formed a threaded socket 226 into which the release valve housing 227 is threaded, a tight joint being secured by a gasket in the bottom of the socket 226 and engaged by the edge of the housing 227. A central hub or hollow boss 228 guides the stem 221, grooves 229 providing a passageway for the discharge of the oil from the cylinder 207 when the positively moved snap valve 230 is opened. The housing 227 has a coupling socket 232 at its lower end to which the discharge pipe 18 is connected by the compression coupling 233. A passageway 234 extends upwardly from the pipe 18 and terminates in a valve port having the yielding seat 235 which seat is adapted to be engaged by the sheet metal valve member 236 which controls the port 234. The valve member 236 is substantially cup shaped with a flat bottom portion seating upon the yielding seat 235. At its upper end the valve member 236 has a cylindrical extension 237 and a flange 238.

The lower end of the cup shaped valve 236 has an opening 239 through the side walls for the passage of oil in and out of the cup shaped valve member. The cylindrical portion of the valve 236 is guided in an opening 240 in the snap barrel or housing 242 which snap barrel forms a cage for the valve and a compression spring 243. The flange 238 of the valve 236 is adapted to rest against the shoulder formed by the wall about the opening 240 in said snap barrel 242 the said spring 243 normally pressing the flange against said shoulder. The snap barrel 242 is guided in a cylindrical portion of the housing 227 as indicated at 244. The upper end of the barrel 242 is provided with a hollow plug 245 which has an inwardly extending wall 246 forming the upper abutment for the spring 243. The stem 221 is guided in the opening in said hollow plug 245, passageways 247 in the form of grooves permitting oil to pass from the cylinder 207 to the interior of the barrel or cage 242. An opening 248 in the barrel or cage permits the liquid to pass therethrough to the outside of the valve 236. The barrel 242 has a bead 249 formed upon the exterior of the same, this bead being adapted to be engaged by the spring pressed plungers 250—250 which are disposed upon opposite sides of said barrel.

These plungers are provided with rounded ends adapted to engage the bead and provide a snap motion for the actuation of said barrel and the valve 236 carried thereby. The plungers 250 have heads lying within the guiding sleeves 252 carried in plugs 253, compression springs 254 being housed in the hollow plugs 253 back of the heads of the pins 250. The heads of the pins 250 prevent the escape of the pins from the bearing sleeves 252 which bearing sleeves are pressed into the adjacent ends of the screw plugs 253.

The operation of the device will be apparent from the above description. As oil is pumped from the reservoir through the inlet pipe 15, past the check valves 114 and 117, the same is discharged into the chamber 224 from which it passes up through the groove 223 along the stem 221 into the cylinder 207 below the sliding piston 213.

As the valve 236 is in closed position as shown in Fig. 11 and held in such closed position by a spring 243 and also being held to its seat by the internal pressure of fluid in the housing 227, the liquid will be accumulated under the pressure of the spring 212 acting upon the piston 213. As the piston rises it raises with it the rod 221 and hence lifts the pressure of the spring 212 off of the valve 236. The lower end of the stem 221 preferably carries a head member which is guided in the cylindrical portion of the valve 236.

As the rod 221 rises it brings the head member 255 out of the cylindrical portion of the valve 236 and finally the head 255 abuts the wall 246 of the hollow plug 245 forming the head of the valve 242. Further upward motion of the rod 221 causes the bead 249 to force the plungers 250 outwardly against their springs 254. The initial motion of the barrel 242 is not transmitted to the valve 236 because of the space between the flanges 238 and the bottom wall 240 of the barrel. However, as soon as the central part of the bead 249 rises above the center line of the plungers 250 the camming action of these plungers upon the bead throw the cage or barrel 242 upwardly causing it to engage the flange 238 of the valve 236 drawing the same into open position. As a result the valve is thrown upwardly away from the seat 235 and the liquid under the spring pressed piston 213 is free to escape out through the discharge pipe 18.

Thereupon the spring 212 expands and drives the piston 213 and its connected plunger rod 221 downwardly discharging the oil into the pipe line 18. As the piston and rod approach the lower end of their stroke, the head 255 on the lower end of the rod 221 enters the hollow valve member 236 and begins to force the valve and cage 242 downwardly against the spring pressed pin 250. Before the head 255 has pushed the valve 236 against its seat 235, the flange 238 of the valve bearing against the flange of the head 240 will drag the barrel or cage overcenter with respect to the pins 250 with the result that the cage or barrel 242 snaps ahead permitting the valve 236 to seat under the pressure of the spring 243 ahead of the movement of the plunger 221.

The piston 213 is thereupon checked in its downward motion and the valve 236 held to seat by the remaining pressure in the connected chambers and passageways. If the valve 236 should tend to leak the escape of liquid will permit the head 255 to be pressed by the spring 212 against the inside of the valve 236 firmly seating the same.

From the above it may be seen that the continuous pumping of the pump plunger 107 accumulates oil under pressure in the accumulator and when a predetermined quantity has been accumulated the valve 236 is snapped open by a mechanical actuating mechanism and when the contents of the accumulator have been discharged to a predetermined point the valve is again snapped shut by the mechanical actuating mechanism.

Obviously any other suitable type of snap actuating mechanism may be employed instead of the specific form which I have shown to perform the function of snapping the valve open and shut at the required times and under the required conditions. The mounting of the device upon the shock absorber cylinder and the construction and mode of operation of the diaphragm and pump is the same as that described in connection with Figs. 2 to 5.

*Continuous lubrication*

Referring now to Figs. 17 and 18 I have shown a continuously acting lubricating pump 256 mounted upon the shock absorber cylinder 17.

This pump comprises a cylinder frame 257 having the diaphragm head 119 cooperating with the opposing diaphragm head or chamber member 122 with diaphragm 106 clamped between the same. The mounting of the diaphragm and its stem and the pumping plunger 107 in the bore which is provided in the cylinder frame 257 and the connection of the diaphragm chamber to the shock absorber cylinder is the same as described in connection with Figs. 2 to 5 inclusive. The inlet connection 15 with the overrunning port 138 and the passageway 137 leading to the adjacent side of the diaphragm is as previously described in connection with Figs. 2 to 5. Likewise the discharge check valves are the same as previously described. The discharge check valve chamber communicates by way of a vertical passageway 258 with the oil delivery pipe 18 which is connected to the cylinder frame 256 by a compression coupling 259 of the character heretofore described. The inlet pipe which leads from the reservoir 14 is likewise coupled to the cylinder frame by the releasable coupling 260 of the compression type heretofore described.

In this system the pump is continuously discharging liquid from the supply reservoir into the pipe line system so long as the pump is in operation.

That is to say instead of discharging into an accumulation chamber, the discharge is directly into the pipe line system. The pipe line system may be of the type described heretofore, that is having connections leading to the bearings with resistance units and check valves, either of the cup leather type or spring pressed type or any other type for securing the desired distribution of lubricant and the prevention of the entry of air into the system or the draining of oil out of the system.

Any of the aforesaid systems may be primed by forcing oil through the inlet pipe 15 under pressure, the piston 107 being forced to the right by the pressure applied to the diaphragm. The oil passes by the check valve and either directly into the system as shown in Fig. 17 or into the accumulation chamber from which it is released into the pipe line system.

I shall now describe combination reservoir and pumping units.

*Combination pumping and reservoir units*

While above I have described the mounting of the shock absorber operated pump directly upon the rear cylinder 17 of the shock absorber, it is to be understood that the pump unit may be mounted at any convenient point and the diaphragm chamber connected to the cylinder 17 or any other working cylinder of the shock absorber by a suitable hydraulic connection.

In Fig. 19 I have shown the shock absorber operated pump as mounted upon the reservoir. The reservoir 263 is preferably made of glass in the shape of a round bottom tank of the same general design as is shown in Figs. 21 and 22. The mounting of the glass reservoir 263 through the medium of the studs 57 upon the sheet metal bulk head 13 is like that described in connection with Fig. 21. A relatively large opening 264 is formed in the bottom of the reservoir 263 and in this a cylinder frame member 265 is mounted. This cylinder frame member has a boss 266 providing a pipe coupling socket for a compression coupling 267 for making connections with the oil discharge pipe 268.

The unit shown in Fig. 19 is a continuously acting unit, that is it provides continuous lubrication as distinguished from periodic lubrication which may be obtained by the use of an accumulator between the pump and the pipe 18 leading to the pipe line system.

The cylinder frame member 265 has a flange 269 which is adapted to engage a resilient ring shaped gasket 270 seated in an annular recess surrounding the opening 264. The cylinder head member 264 is pulled against said gasket 270 to make a tight joint to prevent leakage of oil out of the chamber, by the pipe 272 which at its lower end is connected through the head member 273 to the cooperating head member 274 carried at the upper end of the cylinder frame member 265

The upper end of the pipe 272 is connected to a cover plate 275 by means of a nut 276 which is threaded upon the upper end of the pipe 272 and bears against the cover plate 275 through the intermediary of a lock washer 277. The cover plate 275 has a conical central portion and a flat shelf 278 which through a gasket 279 bears upon the upper edge of the glass reservoir 263. An integral flange 280 on the edge of the shelf 279 embraces a rim of the glass reservoir 263 and lies in an annular recess 282 formed on the outer periphery of the upper end of the glass reservoir 263 to provide a neat appearance. The filling opening 283 is formed through the cover plate 275. A cooperating cover member 284 closely fitting the upper surface of the cover plate 275 has a beaded edge 286 of knurled or corrugated finish to facilitate turning of the cover member 285. The cover member 285 has a filling opening 287 which by rotation of the cover member is adapted to be brought into register with the filling opening 283 and the cover plate 275. The central part of the cover member 284 is provided with a hollow boss 288 extending above the lock washer 277 and seating in an annular recess formed in the periphery of the nut 276, a warped or dished spring washer 289 also seating in said annular recess and serving to press the cover member 284 down upon the surface of the cover plate 275.

The central pipe 272 is connected to the shock absorber cylinder 17 through a pipe 290 which is preferably made of copper. The pipe 290 is connected by a coupling 292 to the upper end of the central pipe 272. This coupling comprises a nut 293 having a conical seat at 294 into which the end of the pipe 290 is expanded or flared. The lower end of the nut 293 is threaded upon the outside of the pipe 272 and a hollow shouldered plug member 295 having an upper conical surface cooperating with the flared surface of the tube is seated in the upper end of the pipe 272. The shoulders of the plug 295 rest upon the end of the walls of the pipe and provide a suitable joint between the plug and the pipe. The conical upper surface of the plug forms a tight joint with the flared end of the tube. The opposite end of the pipe 290 is connected by suitable compression coupling 296 and nipple 297 to the shock absorber cylinder 17. The flow restriction and check valve which has been described heretofore lying between the shock absorber and the diaphragm of the pump may be embodied in the nipple 297 or in the upper end of the head member 273 for the diaphragm 106. The head member 274 which is formed integrally with the cylinder frame member 265 extends up on the inside of the glass reservoir 263, a relatively long cylinder 298 extending between the head member 274 and the flange member 269.

A cylindrical screen embraces the cylinder member 297 and seats against shoulders formed under the head member 274 and above the flange member 265. Within the screen 300 I provide an inlet passageway 302 terminating in an overrunning port like the corresponding overrunning port 138 heretofore described. The construction of the diaphragm 106, its stem member 155 and connected piston 107 is as previously described in connection with Fig. 2. Beyond the cylinder bore in which the piston 107 moves I provide the spring held check valves 114 and 117 with their springs 115 and 118 retained by a hollow retaining screw 225 as described in connection with Fig. 11. The compression coupling 267 of the type heretofore described connects the delivery pipe 18 directly to the discharge valve chamber 116. A passageway 299 leads from the interior of the screen to the lower side of the diaphragm 106 corresponding to the passageway 137 heretofore described.

In order to prime the piston I have shown the priming connection 303 comprising a nipple threaded into a socket 304, the socket communicating by way of the passageway 305 with the check valve chamber between the two check valves 114 and 115. If desired the passageway 305 might lead to the chamber 116 below both check valves. The outer end of the connection 303 is provided with screw threads 306 for the connection of a suitable separable coupling.

The opening in the nipple 303 is closed by means of a conical check valve 307 which may be of cork or other yielding material to secure a tight joint and this check valve 307 is held in place by means of a compression spring 308, the rear end of which is retained by beading in the rear edge of the nipple 303.

The operation is believed to be apparent from the foregoing description. The glass reservoir with its combined pumping mechanism is mounted upon the bulk head 13 as heretofore described and the pipe 290 is connected to an adjacent shock absorber cylinder, preferably the cylinder 17 which operates upon the rebound of the vehicle spring. Impulses of pressure which are sufficient to drive the diaphragm 106 throughout its stroke cause the plunger 107 to make discharge strokes of the pump directly into the pipe line system through the pipe 18. The return strokes of the diaphragm 106 are freely made by the suction on the liquid existing by virtue of the upward motion of the shock absorber plunger through the action of its spring 89. To whatever extent lubricant in the reservoir 263 stands above the diaphragm the submergence pressure will assist in lifting the diaphragm 106.

If desired I may shut off the inlet passageway 302 by a float rising and falling within the screen 300 to prevent the entry of air into the pump and into the pipe line system.

I find that in general it is not necessary to provide such float since the glass reservoir 263 permits the driver of the automobile to see at a glance the level of lubricant therein.

*Combination reservoir unit with accumulator*

In Fig. 20 I have shown a combination reservoir and pumping unit of the type just above described in which however an accumulator and automatic release valve are employed to provide intermittent lubrication. The reservoir and its mounting is the same as previously described. The pumping unit with its diaphragm and connections is as previously described.

In this case the cylinder frame member 309 has a lateral boss 310 forming a housing for the automatic accumulator release valve 312 which is of the construction described in connection with Figs. 2, 3, and 4. A passageway 313 leads from the discharge check valve chamber to the housing 310, this passageway terminating in a yielding valve seat containing a port which is normally covered by the valve 312. The plug 315 is recessed to provide a housing for the spring 311 to hold the valve to its seat and the plug has a yielding ring 317 against which the margin of the valve 312 is adapted to engage when the valve is opened by pressure.

Directly below the discharge check valve chamber 116 and in line therewith the cylinder frame member 309 has a threaded socket 318 into which the accumulator cylinder 207 is threaded. The accumulator is in all respects like that shown in Figs. 8, 9, and 10 having the piston 213, spring 212 and screw cover 299. This accumulator however is inverted with respect to the position which it occupies in the form shown in Figs. 8, 9 and 10.

The operation of this embodiment is believed to be plain from the foregoing description of the unit shown in Fig. 19. The reference numerals on Fig. 20 indicate similar parts in these two embodiments and further detailed description is therefore not necessary.

The system is primed in the same manner by the priming nipple 303. Pulsations of pressure operating upon the diaphragm 106 serve to drive oil under pressure past the check valves into the accumulator, the plunger 213 thereof being depressed against the spring 212 until sufficient pressure is accumulated to open the valve 312 whereupon the accumulating charge of oil will be driven out past the valve 312 and into the pipe line system through the pipe 18.

The area which is exposed to pressure on the check valve 312 when the same is closed is much less than that which is exposed to pressure when the same starts to open.

The construction of the discharge check valve may be varied to secure the desired accumulation of pressure and discharge of pressure from the accumulator within a predetermined limit.

From the foregoing it will be seen that I have provided a system of either continuous or intermittent lubrication taking the variations of pressure in a shock absorber as a suitable operating means for the delivery of lubricant from a centralized supply to the bearings to be lubricated.

It will be apparent that I could employ a spring for making the return stroke of the diaphragm and connected pumping plunger, but I find the same for my purposes not necessary.

I do not intend to be limited to the details shown and described nor to the precise mode of operation herein stated, as I believe that my invention is broadly new.

I claim:—

1. In combination a shock absorber having a liquid cylinder, a piston therefor, a lubricating pump comprising a cylinder, a piston therefor, a diaphragm subject to the pressure in the shock absorber cylinder for making the discharge stroke of the pump piston and means for preventing the making of a discharge stroke of the pump unless the pressure in the shock absorber cylinder persists for a predetermined period of time.

2. In combination a shock absorber having a cylinder, a piston therefor, a lubricating pump having a cylinder, a piston therefor, a motor for operating the pump piston, said motor having a movable element, there being a connection between the movable element and the shock absorber cylinder and a one way flow restriction in said connection.

3. In combination with a chassis frame having a shock absorber disposed at one side of the chassis frame and a lubricating pump operatively connected to said shock absorber and arranged to be actuated by fluctuations in pressure in said shock absorber, said pump and connection being disposed on the back side of the shock absorber whereby the shock absorber shields the pump and connections from road gravel and the like.

4. In combination with a chassis frame having a hydraulic shock absorber disposed at one side of the chassis frame and a lubricating pump having a pressure responsive means connected to the shock absorber, said pressure responsive means being actuated by fluctuations in pressure in said hydraulic shock absorber and said pump and motor being disposed on the back side of the shock absorber whereby the shock absorber shields the pump and motor from road gravel and the like.

5. In combination a hydraulic shock absorber having a cylinder adapted to contain liquid, a piston therefor, a diaphragm head having a stud secured to said cylinder, a cooperating diaphragm head rigidly secured to said first head, a diaphragm clamped between said heads, said stud having a passageway therethrough forming a communicating passageway between one side of the diaphragm and the shock absorber cylinder, a pump cylinder body integral with said latter head, said body having a cylinder bore and having an inlet passageway communicating with said bore and with the adjacent side of the diaphragm, a piston for said cylinder bore and a discharge passageway communicating with the bore, said latter passageway having a discharge check valve.

6. A lubricating pump comprising a cylinder frame having an integral diaphragm head and having a cylinder bore, a piston in said bore, a diaphragm secured peripherally to said head and centrally to said piston, said diaphragm being operable by a differential in pressure existing on opposite sides thereof, the pressures on opposite sides of said diaphragm being above atmospheric pressure.

7. A lubricating pump comprising a cylinder frame having an integral diaphragm head and having a cylinder bore, a piston in said bore, a diaphragm secured peripherally to said head and centrally to said piston, there being an inlet passageway in the cylinder frame communicating with the bore and communicating with the diaphragm, said diaphragm being subjected to the pressure of lubricant in said inlet passageway.

8. In combination a shock absorber cylinder, a lubricating pump comprising a cylinder frame having an integral diaphragm head and having a cylinder bore, a piston in said bore, a diaphragm connected to said piston, a cooperating diaphragm head secured to said first head and clamping the diaphragm peripherally, a hollow boss on the rear of said latter head providing a passageway communicating with the proximate side of the diaphragm and a screw coupling for clamping the hollow boss in any desired angular position to said shock absorber cylinder.

9. A lubricating pump comprising a cylinder frame having an integral diaphragm head and having a cylinder bore, a piston in said bore, a diaphragm connected to said piston, a cooperating diaphragm head secured to said first head and clamping the diaphragm peripherally, a hollow boss on the rear of said latter head providing a passageway communicating with the proximate side of the diaphragm and a one-way flow restriction in said latter passageway.

10. In a centralized lubricating system, a reservoir for lubricant, a pipeline system for distributing the lubricant to the bearings, a lubricating pump having an inlet communicating with said reservoir and having a discharge passageway, an accumulator for accumlating lubricant under pressure from said discharge passageway, a connection from said accumulator to the pipeline system and a pressure controlled release valve between said accumulator and the pipeline system for releasing the accumulated lubricant under pressure from said accumulator into said pipeline system, and a hydraulic motor member for operating said lubricating pump.

11. In a centralized lubricating system, a reservoir for lubricant, a pipeline system for distributing the lubricant to the bearings, a lubricating pump having an inlet communicating with said reservoir and having a discharge passageway an accumulator for accumulating lubricant under pressure from said discharge passageway, a connection from said accumulator to the pipeline system and a pressure controlled release valve between said accumulator and the pipeline system for releasing the accumulated lubricant under pressure from said accumulator into said pipeline system, and a hydraulic motor member for operating said lubricating pump, and a shock absorber for operating said hydraulic motor.

12. In a centralized lubricating system, a pipeline system for distributing lubricant to the bearings, a reservoir for accumulating lubricant under pressure, a pressure release valve between said reservoir and the pipeline system, a pump for charging said reservoir with lubricant under pressure and a hydraulic shock absorber for operating said pump.

13. In combination with a reservoir for lubricant, a pipeline system for distributing lubricant to the bearings to be lubricated, a pump for discharging lubricant from the reservoir into the pipeline system, said pump being mounted upon said reservoir a hydraulic motor for operating said pump and a pressure accumulator associated with said pump for receiving the discharge thereof and means between said accumulator and said pipe line system for preventing discharge of lubricant from said accumulator before the pressure therein has reached a predetermined amount.

14. In combination with a glass reservoir for lubricant, a pipeline system leading to the bearings to be lubricated, said reservoir having an opening in the bottom, a cylinder frame secured in said opening, said cylinder frame comprising a pump cylinder, a piston therefor, a diaphragm actuatable to operate said piston, a diaphragm chamber connected to said frame and a fluid pressure connection to said diaphragm.

15. In combination with a glass reservoir for lubricant, a pipeline system leading to the bearings to be lubricated, said reservoir having an opening in the bottom a cylinder frame secured in said opening, said cylinder frame comprising a pump cylinder, a piston therefor, a diaphragm actuatable to operate said piston, a diaphragm chamber connected to said frame and a fluid pressure connection to said diaphragm, and a hydraulic shock absorber having a cylinder connected to said fluid pressure connection.

16. In combination with a glass reservoir having an opening in the bottom of the same, mounting studs on the side of said glass reservoir, a metal plug mounted in and sealing the opening in the bottom of the reservoir, a pipe connection at the lower end of the plug, a passageway from the inside of the reservoir through said plug to the pipe connection, a central stem connected to said plug and a cover member for the reservoir said stem being connected to said cover member for holding said plug in said opening.

17. In combination with a glass reservoir having an opening in the bottom mounting studs at the side of the same, a cover plate for the upper end of the cylinder, said cover plate having an aperture therethrough, a cover member having an aperture adapted to register with the aperture in the cover plate said cover member being rotatable to move its aperture out of register with the aperture in the cover plate, a plug member in the opening in the lower end of the reservoir, a pipe connection to the lower end of the plug there being a passageway through the plug from the inside of the reservoir to the pipe connection and a rod connected in tension between said plug and the cover plate.

18. In combination with a glass reservoir having an opening in the bottom, mounting studs at the side of the same, a cover plate for the upper end of the reservoir, said cover plate having an aperture therethrough, a cover member having an aperture adapted to register with the aperture in the cover plate, said cover member being rotatable to move its aperture out of register with the aperture in the cover plate, a plug member in the opening in the lower end of the reservoir, a pipe connection to the lower end of the plug, there being a passageway through the plug from the inside of the reservoir to the pipe connection and a rod connected in tension between said plug and the cover plate, a lubricating pump connected to said plug, a fluid pressure motor member for operating the pump, said tension member being hollow and providing a fluid pressure passageway for operating said fluid pressure motor.

19. In combination with a glass reservoir having a mounting stud at one side thereof and having an opening in the bottom thereof, a metal plug fitting in said opening, said plug comprising a cylinder frame having a cylinder bore, a piston in said cylinder bore, a discharge passageway extending through the bottom of the plug, a discharge check valve for said passageway the upper end of the plug forming a diaphragm head, a cooperating diaphragm head connected to the first diaphragm head, a diaphragm clamped peripherally between said heads, a pipe connected to the latter diaphragm head, a cover plate mounted on the open end of the reservoir, said plate being connected to said pipe and a fluid pressure connection to said pipe.

20. In combination with a glass reservoir having a mounting stud at one side thereof and having an opening in the bottom thereof, a metal plug fitting in said opening, said plug comprising a cylinder frame having a cylinder bore, a piston in said cylinder bore, a discharge passageway extending through the bottom of the plug, a discharge check valve for said passageway the upper end of the plug forming a diaphragm head, a cooperating diaphragm head connected to the first diaphragm head, a diaphragm clamped peripherally between said heads, a pipe connected to the latter diaphragm head, a cover plate mounted on the open end of the reservoir, said plate being connected to said pipe and a fluid pressure connection to said pipe and a priming inlet passageway communicating with said discharge passageway beyond the discharge check valve.

21. In combination with a glass reservoir having a mounting stud at one side thereof and having an opening in the bottom thereof, a metal plug fitting in said opening, said plug comprising a cylinder frame having a cylinder bore, a piston in said cylinder bore, a discharge passageway extending through the bottom of the plug, a discharge check valve for said passageway the upper end of the plug forming a diaphragm head, a cooperating diaphragm head connected to the first diaphragm head, a diaphragm clamped peripherally between said heads, a pipe connected to the latter diaphragm head, a cover plate mounted on the open end of the reservoir, said plate being connected to said pipe and a fluid pressure connection to said pipe, and a hydraulic shock absorber having a cylinder communicating with said fluid pressure pipe.

22. In combination a shock absorber having a fluid pressure chamber, a piston therefor, a diaphragm chamber connected to said pressure chamber, a pump having a pumping piston operated by said diaphragm and means for causing a portion of the stroke of the pumping piston to be ineffective.

23. In combination a shock absorber having a fluid pressure chamber, a piston therefor, a diaphragm chamber connected to said pressure chamber, a pump having a pumping piston operated by said diaphragm, and means for causing a portion of the stroke of the pumping piston to be ineffective, said means comprising a pumping cylinder having an inlet port which is overrun by the pumping piston.

OSCAR U. ZERK.